US012759655B2

(12) United States Patent
Federl et al.

(10) Patent No.: US 12,759,655 B2
(45) Date of Patent: Oct. 13, 2026

(54) CONVEYING SYSTEM, METHOD AND DRIVERLESS TRANSPORT VEHICLE FOR TRANSPORTING COMPONENTS

(71) Applicant: Bayerische Motoren Werke Aktiengesellschaft, Munich (DE)

(72) Inventors: Daniel Federl, Herrnried (DE); Bjoern Lautenschlager, Pettendorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 536 days.

(21) Appl. No.: 18/033,641

(22) PCT Filed: Oct. 19, 2021

(86) PCT No.: PCT/EP2021/078884
§ 371 (c)(1),
(2) Date: Apr. 25, 2023

(87) PCT Pub. No.: WO2022/106133
PCT Pub. Date: May 27, 2022

(65) Prior Publication Data

US 2023/0394427 A1 Dec. 7, 2023

(30) Foreign Application Priority Data

Nov. 17, 2020 (DE) ..................... 10 2020 130 338.6

(51) Int. Cl.
*B62D 65/18* (2006.01)
*B60D 1/42* (2006.01)
(Continued)

(52) U.S. Cl.
CPC ............... *B62D 65/18* (2013.01); *B60D 1/42* (2013.01); *B60P 1/64* (2013.01); *B65G 1/023* (2013.01);
(Continued)

(58) Field of Classification Search
CPC ........ B62D 65/18; G06Q 10/08; G06Q 50/04; G06Q 50/40; B60D 1/42; B60P 1/64; B65G 1/023; B65G 1/04; B65G 1/065
See application file for complete search history.

(56) References Cited

U.S. PATENT DOCUMENTS

2 A * 7/1836 Goulding .............. D01G 21/00
57/58.49
3,589,697 A * 6/1971 Hays ..................... C21D 1/673
266/117
(Continued)

FOREIGN PATENT DOCUMENTS

CN 106537273 A 3/2017
CN 107672986 A * 2/2018 ........... B65G 1/0492
(Continued)

OTHER PUBLICATIONS

CN-107672986-A (Year: 2018).*
(Continued)

*Primary Examiner* — Ernesto A Suarez
*Assistant Examiner* — Laurence R Brothers
(74) *Attorney, Agent, or Firm* — Crowell & Moring LLP

(57) ABSTRACT

A conveying system for transporting components includes at least one driverless transport vehicle that has a chassis and an undercarriage which is held on the chassis and by which the driverless transport vehicle can be moved along the ground, at least one apparatus that can be transported along the ground by the driverless transport vehicle to transport the components, wherein the apparatus has an apparatus-side positioning device and the driverless transport vehicle has a vehicle-side positioning device, and by direct interaction between the apparatus-side positioning device of the apparatus, the apparatus is moved into a target position relative to the driverless transport vehicle.

20 Claims, 7 Drawing Sheets

(51) Int. Cl.

| | |
|---|---|
| ***B60P 1/64*** | (2006.01) |
| ***B65G 1/02*** | (2006.01) |
| ***B65G 1/04*** | (2006.01) |
| ***B65G 1/06*** | (2006.01) |
| ***G06Q 10/08*** | (2024.01) |
| ***G06Q 50/04*** | (2012.01) |
| *G06Q 50/40* | (2024.01) |

(52) U.S. Cl.

CPC ............... *B65G 1/04* (2013.01); *B65G 1/065* (2013.01); *G06Q 10/08* (2013.01); *G06Q 50/04* (2013.01)

(56) References Cited

U.S. PATENT DOCUMENTS

| | | | | |
|---|---|---|---|---|
| 9,242,799 | B1 * | 1/2016 | O'Brien | G05B 15/02 |
| 2004/0052621 | A1 | 3/2004 | Beerhalter et al. | |
| 2006/0210382 | A1 * | 9/2006 | Mountz | B65G 1/137 414/498 |
| 2011/0103924 | A1 * | 5/2011 | Watt | B65G 49/00 414/800 |
| 2017/0022010 | A1 * | 1/2017 | D'Andrea | B65G 1/0492 |
| 2017/0203921 | A1 | 7/2017 | Issing | |
| 2017/0247201 | A1 | 8/2017 | Pruessmeier | |
| 2017/0248961 | A1 | 8/2017 | Pfaff et al. | |
| 2018/0086561 | A1 * | 3/2018 | Stubbs | B65G 1/137 |
| 2022/0144546 | A1 | 5/2022 | Tendo et al. | |

FOREIGN PATENT DOCUMENTS

| | | | | | |
|---|---|---|---|---|---|
| CN | 107902315 | A | * | 4/2018 | B65G 1/137 |
| CN | 108583733 | A | | 9/2018 | |
| CN | 109775211 | A | | 5/2019 | |
| DE | 10 2005 014 040 | A1 | | 9/2006 | |
| DE | 10 2014 010 729 | A1 | | 1/2016 | |
| EP | 1 362 810 | B1 | | 8/2007 | |
| EP | 1 610 976 | B1 | | 9/2010 | |
| EP | 3 098 111 | A1 | | 11/2016 | |
| EP | 3 180 274 | B1 | | 12/2017 | |
| EP | 3 206 976 | B1 | | 1/2018 | |
| WO | WO 2020/174711 | A1 | | 9/2020 | |

OTHER PUBLICATIONS

CN-107902315-A (Year: 2018).*

International Search Report (PCT/ISA/210) issued in PCT Application No. PCT/EP2021/078884 dated Feb. 3, 2022 with English translation (six (6) pages).

German-language Written Opinion (PCT/ISA/237) issued in PCT Application No. PCT/EP2021/078884 dated Feb. 3, 2022 (six (6) pages).

German-language Search Report issued in German Application No. 10 2020 130 338.6 dated Jun. 7, 2021 with partial English translation (14 pages).

English translation of Chinese-language Office Action issued in Chinese Application No. 202180054979.9 dated Jan. 31, 2026 (8 pages).

* cited by examiner

CONVEYING SYSTEM, METHOD AND DRIVERLESS TRANSPORT VEHICLE FOR TRANSPORTING COMPONENTS

FIELD

The invention relates to a conveying system for transporting components. Furthermore, the invention relates to a method for transporting components. The invention also relates to a driverless transport vehicle.

BACKGROUND AND SUMMARY

EP 1 362 810 B1 discloses a loading and unloading station for load carriers of vehicle bodies. A linear transport system with a carriage guide rail which has a curved portion can be gathered as known from EP 3 206 976 B1. EP 1 610 976 B1 has disclosed an apparatus which can be operatively connected to a transport vehicle in such a way that it is capable of loading a container from a surface on to the vehicle. Moreover, EP 3 180 274 B1 discloses a warehouse and order picking system for storing and retrieving a multiplicity of warehouse goods.

It is an object of the present invention to provide a conveying system, a method and a driverless transport vehicle, with the result that components, in particular for producing products such as, for example, vehicles, can be transported particularly advantageously.

According to the invention, this object is achieved by way of a conveying system with the features disclosed herein, by way of a method with the features disclosed herein, and by way of a driverless transport vehicle with the features disclosed herein. Advantageous refinements of the invention are also the subject matter of the present disclosure.

A first aspect of the invention relates to a conveying system for transporting or conveying components, in particular during production of at least one product or contact of production of a plurality of products. In other words, the conveying system is utilized, for example, to convey or to transport components, from which at least one product or a plurality of products is or are produced. The product is, for example, a vehicle, in particular a motor vehicle, such as a motor car, for example, and preferably a passenger car. It is therefore conceivable that the conveying system is used within the context of production of motor cars, in particular passenger cars. The invention is particularly and generally suitable for a provision of material. It is not significant whether this serves for production purposes or merely logistics purposes. The production of the product or the products is carried out, for example, in a building, such as a hall, for example, in particular a production hall. The conveying system comprises at least one driverless transport vehicle (FTF) which is also called a transport robot or an autonomous transport robot. In particular, the driverless transport vehicle can also be called an STR (Smart Transport Robot). The driverless transport vehicle comprises a chassis and a running gear which is held on the chassis and by means of which the driverless transport vehicle can be moved, in particular can be driven, along a floor, in particular of the building. For example, the running gear comprises at least one floor contact element, in particular a plurality of floor contact elements. Via the floor contact element, the driverless transport vehicle can be supported or is supported on the floor, in particular directly, downward in the vehicle z-direction or in the vertical direction. When the driverless transport vehicle is moved, in particular driven, along the floor by means of the running gear, the respective floor contact element moves, in particular rotates, relative to the chassis, for example. The floor contact element can be, in particular, a wheel which is held at least indirectly rotatably on the chassis. When the driverless transport vehicle is moved along the floor, the wheel rotates relative to the chassis, and the wheel which is also called a vehicle wheel rolls on the floor. The driverless transport vehicle is preferably a track-free vehicle. The driverless transport vehicle is a driverless transport vehicle, since it is moved automatically or autonomously, in particular by means of an electronic computing device, and therefore in a driverless manner along the floor, in order to convey or to transport the components as a result.

Moreover, the conveying system comprises at least one apparatus for transporting the components, which at least one apparatus is configured separately from the driverless transport vehicle and can be transported along the floor by means of the driverless transport vehicle. The apparatus can be a container which is also called a load carrier or a component carrier and has a receiving region or receiving chamber, in which at least one of the components can be arranged at least partially. For example, the container can be supported, in particular directly, on the transport vehicle. Furthermore, it is conceivable that the apparatus is an intermediate element such as, for example, a trolley, in particular a roller trolley. Here, for example, the intermediate element is configured separately from the driverless transport vehicle and separately from the abovementioned container, in particular in such a way that the container can be supported or is supported on the driverless transport vehicle via the intermediate element. In the state of the container, in which it is supported on the driverless transport vehicle, for example, directly or else via the intermediate element, the at least one component which is arranged at least partially in the container can be moved along the floor and, as a result, transported by means of the driverless transport vehicle in such a way that the driverless transport vehicle is moved, in particular is driven, along the floor in the abovementioned state. Furthermore, it is conceivable that the apparatus has a pallet or similar carrier, onto/on which at least one of the components can be placed or can be supported; for example, the pallet or the carrier can be supported on the transport vehicle directly or else via the intermediate element and, as a consequence, can be conveyed along the floor and therefore transported by means of the transport vehicle.

The abovementioned intermediate vehicle makes it possible, for example, for different carriers such as, for example, pallets and/or containers to be supported on the driverless transport vehicle in a simple way and, in particular, in the same way, to be precise via the intermediate element, with the result that, as a consequence, via the intermediate element and the carrier, the driverless transport vehicle can transport the respective component which is supported on the carrier, for example lies on the carrier, and/or is arranged in a receiving space or receiving region of the carrier, by the driverless transport vehicle and, with it, the intermediate element, the carrier and the respective component being moved along the floor.

In order for it then to be possible for the components to be transported and therefore conveyed in a particularly advantageous way, it is provided according to the invention that the apparatus has an apparatus-side, first positioning device. It is provided, furthermore, that the driverless transport vehicle has a vehicle-side, second positioning device, by means of which, with direct interaction with the apparatus-side positioning device of the apparatus, the apparatus can be moved relative to the driverless transport vehicle into a setpoint position and can therefore be aligned. In other words, for example, the driverless transport vehicle is moved, in particular automatically, relative to the apparatus in such a way that the positioning devices come into direct interaction, that is to say the first positioning device interacts directly with the second positioning device and vice versa. The direct interaction of the positioning devices can be understood to mean, in particular, that the positioning devices make direct contact with one another. First of all, for example, the apparatus is supported on the driverless transport vehicle at least indirectly, in particular directly, in such a way that the apparatus is situated in an actual position which differs from the desired setpoint position relative to the driverless transport vehicle. As a result of the direct interaction of the positioning devices, the apparatus which is first of all situated in the actual position is moved relative to the driverless transport vehicle out of the actual position into the setpoint position. As a consequence, the apparatus is particularly advantageously aligned relative to the driverless transport vehicle, with the result that, for example, the driverless transport vehicle can then particularly advantageously transfer the apparatus which is supported on the driverless transport vehicles and is situated in the setpoint position, for example, to a further apparatus such as, possibly and for example, a conveying device such as, for example, to a rotary table or a rotary frame, in particular without tilting or similar effects occurring which would prevent a transfer of the apparatus from the driverless transport vehicle to the apparatus, in particular to the rotary frame or to the rotary table, and without it being necessary for a person to act or intervene, in order to make the abovementioned transfer of the apparatus from the driverless transport vehicle to the rotary table or to the rotary frame possible. The invention therefore provides a precondition for fully automated or highly automated conveying of the components, with the result that, for example, an assembly line, along which the products are produced, can be supplied with the components in a particularly simple, rapid and inexpensive way. For example, the invention generally makes a particularly advantageous transfer of material into another, in particular automated, region, conveyor technology system, warehouse system, etc. possible.

The invention is based, in particular, on the following findings and considerations: in intra-logistics, goods transportation to a production region will in future be carried out with the aid of autonomous systems, in particular autonomous or driverless transport vehicles, instead of as up to now with manual tugger trains.

Containers are usually used for transporting components, the respective container being arranged, for example, first of all on a respective, standardized roller trolley. The respective roller trolley and, with it, the container which is arranged on it are pushed, for example, by a driver of a manual tugger train by hand into a rotary frame which is also called a rotary table. In particular, the roller trolley and, with it, the container which is arranged on it are pushed into the rotary frame on what is known as a placement side of the rotary frame, the placement side facing away from the abovementioned assembly line which is also simply called a belt. After the roller trolley and, with it, the container have been pushed into the rotary frame, the rotary frame can rotate, in particular about a vertical rotational axis, and in the process drive the roller trolley and therefore the container which is arranged on it and, as a result, can convey or move the roller trolley and, with it, the container from the placement side onto an assembly side which faces the assembly line. As a consequence, for example, a person carrying out the production of the products who is situated on the assembly line side can remove the components which are arranged in the container from the container and can install them.

The driverless transport vehicle then makes it possible for the roller trolley and therefore the carrier which is arranged on it for carrying at least one of the components to be moved and therefore to be transported automatically or autonomously along the floor, the driverless transport vehicle preferably also being configured to push or convey the roller trolley into the rotary frame. To this end, that is to say in order to push or convey the roller trolley and, with it, the carrier automatically or autonomously into a or the abovementioned rotary frame by means of the driverless transport vehicle, a simple but highly available solution is desirable in order to make it possible for roller trolleys and carriers which are arranged on them for carrying the components to be positioned in the rotary frame with repeatable accuracy. To this end, it is advantageous if the respective roller trolley and therefore the carrier which is supported on it and, as a consequence, the abovementioned apparatus can be aligned relative to the driverless transport vehicle in a simple but precise and preferably automatic way, in particular in such a way that the apparatus assumes the abovementioned setpoint position relative to the driverless transport vehicle. This can be ensured by way of the invention, in particular by way of the positioning devices.

The carrier is, for example, what is known as a sequence container to be transported which is situated on the roller trolley and is configured separately from the roller trolley here. The roller trolley has, for example, rotatably mounted and, for example, eccentrically mounted rollers which are mounted rotatably and/or eccentrically, for example, on a frame of the roller trolley. Therefore, the roller trolley can be supported or is supported directly on the floor via its, for example, precisely four rollers in the vertical direction downward. Therefore, the roller trolley and therefore the carrier which is arranged on the roller trolley can be rolled along the floor. The carrier situated on the roller trolley, that is to say, for example, the abovementioned sequence container, is loaded and provided manually by a person, for example. This is to be understood to mean that the person arranges at least one of the components or a plurality of the components on the carrier, in particular arranges it/them in the sequence container. The provision of the sequence container by the person and any different floor conditions in a production region of the building usually do not permit highly accurate positioning of the container and/or the roller trolley. Before the sequence container which is also called a container or the roller trolley can be received by the driverless transport vehicle, a measurement of the container and/or the roller trolley is carried out, for example, by means of an optical detection system, in particular by means of a camera and/or by means of a laser. For example, a stereo camera is used as the camera and/or a time of flight (TOF) measurement is carried out, measured results or measured data being obtained by way of the measurement. The measured results characterize, for example, at least one property, in particular at least one external dimension, of the container and/or the roller trolley. The driverless transport vehicle which is also simply called a robot is positioned below the roller trolley at least partially, in particular at least predominantly or completely, in a manner which is dependent on the measured results. Thereupon, for example, at least one part region, in particular the chassis, of the driverless transport vehicle is raised, and as a consequence is moved upward in the vertical direction and is therefore moved away from the floor, for example, in particular in such a way that the rollers of the roller trolley lift up from the floor, and as a consequence are spaced apart from the floor. As a consequence, the roller trolley is supported on the driverless transport vehicle in the vertical direction downward, in particular directly, and the container is supported on the driverless transport vehicle via the roller trolley, in particular downward in the vertical direction. As a consequence, the driverless transport vehicle can be moved, in particular driven, along the floor, in particular automatically, as a result of which the roller trolley and therefore the container and the at least one component which is arranged therein are moved, in particular driven, along the floor by means of the driverless transport vehicle and, as a result, are transported or conveyed.

On account of a tolerance-affected interaction of components such as, for example, the driverless transport vehicle with manufacturing tolerances and a corresponding odometry deviation, the camera with measuring inaccuracies, the floor contact elements and wear thereof, etc., the container or the roller trolley usually cannot be received with sufficiently repeatable accuracy, with the result that the above-mentioned actual position of the apparatus, that is to say in the present case of the roller trolley and/or the container, relative to the driverless transport vehicle is not known. If no corresponding countermeasures are taken, this can lead to undesired collisions of the roller trolley and/or the container with the rotary frame, which makes, for example, an automatic transfer of the roller trolley or the container and, as a consequence, of the apparatus from the driverless transport vehicle to the rotary frame complicated or even impossible. It has been found that receiving the roller trolley and therefore the container by way of the driverless transport vehicle with a repeatable accuracy of up to approximately ±5 mm is advantageous, in order to make a desired transfer of the roller trolley or the container and, as a consequence, the apparatus from the driverless transport vehicle to the rotary frame possible. Receiving of this type with repeatable accuracy is conventionally not possible, however. In order, furthermore, to ensure as effective a utilization as possible of an available production area, in particular the external dimensions of the rotary frame should not be exceeded excessively, in particular with regard to dimensions of the apparatus and, as a consequence, of the container and/or the carrier which correspond to its internal and external dimensions. Therefore, a highly accurate or precise discharge or transfer of the apparatus and, as consequence, of the roller trolley and the container, from the driverless transport vehicle to the rotary frame is desirable and advantageous. This can then be realized by way of the invention, since the invention, in particular the positioning devices, enables/enable or brings/bring about a simple and precise alignment of the apparatus relative to the driverless transport vehicle, in particular in the case of the above-described, preferably automatic operation, in the case of which the driverless transport vehicle drives under the apparatus, in particular under the roller trolley, as a result of which the positioning devices are moved or come into direct interaction.

A further advantage of the invention is that it can be implemented simply and inexpensively. Moreover, driverless transport vehicles which already exist and apparatuses which already exist such as, for example, roller trolleys can be retrofitted simply and can therefore be developed to form the conveying system according to the invention.

Furthermore, it is advantageous if the driverless transport vehicle itself can be positioned with repeatable accuracy and precisely relative to the rotary frame, in particular in such a way that the previously driverless transport vehicle drives relative to the rotary frame, in particular automatically, and therefore aligns itself into an advantageous setpoint alignment. To this end, for example, the rotary frame has a clear geometry which can be detected or is detected, in particular optically, by means of a detection system of the driverless transport vehicle. The detection system which is also called a detection device comprises, for example, a laser scanner, by means of which the geometry which is provided on the rotary frame is scanned and therefore detected. In a manner which is dependent on the detection of geometry, the driverless transport vehicle is moved, in particular automatically, relative to the rotary frame, in particular in such a way that the driverless transport vehicle can be aligned or positioned, in particular automatically, relative to the rotary frame with an accuracy of a few millimeters. As a consequence, the driverless transport vehicle can move, in particular automatically, the apparatus and, as a consequence, the roller trolley and the container or carrier which is arranged on it into the rotary frame, without undesired collisions occurring. It can be seen that the rotary frame is a disposal station, at which the driverless transport vehicle transfers the apparatus which is initially arranged on it, in particular to a component which is arranged at the disposal station such as the above-mentioned rotary frame.

The direct interaction of the positioning devices can comprise, in particular, that the positioning devices mechanically interact directly. The positioning devices bring about, in particular, at least one movement of the apparatus, which movement takes place relative to the driverless transport vehicle, in such a way that the apparatus is moved into the setpoint position relative to the driverless transport vehicle. As a result, the apparatus which is a transported good which is to be transported or to be conveyed by means of the driverless transport vehicle can be aligned particularly precisely with respect to the driverless transport vehicle, with the result that the driverless transport vehicle can then transfer the transport good which is arranged on it and is advantageously aligned relative to it to the component at the disposal station, without undesired collisions occurring between the transport good and the component. At the same time, (in particular, external) dimensions of the component (rotary frame) can advantageously be kept small, with the result that available space or room can be utilized effectively and efficiently.

In one advantageous refinement of the invention, the vehicle-side positioning device has at least one roller (also called a positioning roller) or ball which can be rotated about at least one rotational axis or about an infinite number of rotational axes and therefore freely relative to the chassis. As a result, particularly simple and sufficiently precise positioning or alignment of the apparatus relative to the driverless transport vehicle can be realized.

In order for it to be possible for sufficiently precise alignment or positioning of the apparatus relative to the driverless transport vehicle to be ensured even over a long service life, it is provided in a further refinement of the invention that the roller is formed from a steel, in particular from a quenched and tempered steel.

A further embodiment is distinguished by the fact that the positioning roller is mounted rotatably on the chassis via an anti-friction bearing system. For example, the roller is mounted via the anti-friction bearing system on a lifting frame of the transport vehicle and via the lifting frame on the chassis. As a result, low-friction and smooth-running mounting and therefore movement of the positioning roller can be realized, as a result of which the apparatus can be aligned particularly precisely relative to the driverless transport vehicle.

It is provided in a further, particularly advantageous embodiment of the invention that the apparatus-side positioning device has at least two, in particular in each case planar, surfaces which run obliquely or perpendicularly with respect to one another and along which the positioning roller can roll in order to move the apparatus into the setpoint position. As a result, particularly precise positioning or alignment of the apparatus relative to the driverless transport vehicle can be realized in a particularly simple and inexpensive way. As an alternative or in addition, the apparatus-side positioning device can have a cone, that is to say a conical or frustoconical surface, on which the ball can roll, for example, in order to move the apparatus into the setpoint position.

It has been shown to be particularly advantageous here if an indentation which is set back with respect to the surfaces is arranged between the surfaces, in which indentation the roller can be received at least partially. The indentation is set back, for example, upward in the vertical direction with respect to the surfaces. The indentation can make secure holding or fixing of the apparatus in the setpoint position possible, for example. In other words, the indentation can make it possible that the apparatus moves precisely and securely into the setpoint position and comes to lie or to stop there, and the indentation can avoid that the apparatus undesirably moves out of the setpoint position again. If the apparatus is not yet situated in its setpoint position, for example, when the driverless transport vehicle or the apparatus drives, in particular below the roller trolley, the positioning devices interact directly, for example, in such a way that the roller comes into direct contact with one of the in particular planar surfaces. If the apparatus is then lifted by means of the driverless transport vehicle, in particular in such a way that the abovementioned rollers of the roller trolley lift up from the floor of the building, the roller can roll on the surface or vice versa, in particular until the roller comes at least partially into the indentation or into the region of the indentation. The apparatus has then reached its setpoint position, and the apparatus maintains it setpoint position securely, with the result that a precise alignment of the apparatus relative to the driverless transport vehicle can be ensured, in particular also during the transport of the apparatus along the floor. It can therefore be ensured, in particular, that the apparatus is still situated in its setpoint position when the driverless transport vehicle and therefore the apparatus reach the rotary frame or the disposal station.

In order to realize particularly precise positioning of the apparatus relative to the driverless transport vehicle in a particularly inexpensive way, it is provided in a further refinement of the invention that the surfaces are formed by way of a single-piece positioning element. For example, the positioning element is formed from a metallic material, in particular from a steel.

It has been shown to be particularly advantageous here if the positioning element is held on a main body, configured separately from the positioning element, of the apparatus and is held at a spacing from the main body by means of a spacer element which is configured separately from the main body and separately from the positioning element. For example, the positioning element is held on the main body of the apparatus, in particular on the abovementioned frame, via the spacer element which is configured separately from the main body and separately from the positioning element, is arranged between the main body and the positioning element, and by means of which the positioning element is held at a spacing from the main body. By means of the spacer element or by means of different spacer elements, a spacing which runs, in particular, in the vertical direction, between the positioning element and the main body or between the positioning element and the floor can be set in a simple and inexpensive way, with the result that a precise alignment of the apparatus relative to the driverless transport vehicle can be produced. For example, the positioning element is held on the main body in such a way that the positioning element is clamped against the main body or onto the main body.

A second aspect of the invention relates to a method for transporting components by means of a conveying system, in particular in accordance with the first aspect of the invention. In the case of the method, at least one apparatus which is configured separately from the driverless transport vehicle and, via the apparatus, at least one of the components are moved along a floor and, as a result, transported by means of a driverless transport vehicle which has a chassis and a running gear which is held on the chassis, by the driverless transport vehicle being driven and, as a result, being moved in a driverless and automatic manner by means of the running gear along the floor. Advantages and advantageous refinements of the first aspect of the invention are to be considered to be advantages and advantageous refinements of the second aspect of the invention, and vice versa.

In order for it then to be possible for the components to be transported particularly advantageously, it is provided in the case of the second aspect of the invention that the apparatus has an apparatus-side positioning device, and that the driverless transport vehicle has a vehicle-side positioning device, by means of which, with direct interaction with the apparatus-side positioning device of the apparatus, the apparatus is moved relative to the driverless transport vehicle into a setpoint position and is aligned as a result.

Finally, a third aspect of the invention relates to a driverless transport vehicle for transporting at least one apparatus for transporting components. The driverless transport vehicle in accordance with the third aspect of the invention comprises a chassis and a running gear which is held on the chassis and by means of which the driverless transport vehicle can be moved along a floor in order to transport the apparatus.

In order for it to then be possible for the components to be transported particularly advantageously by means of the driverless transport vehicle, it is provided according to the invention that the driverless transport vehicle has a vehicle-side positioning device, by means of which, with interaction with an apparatus-side positioning device of the apparatus, the apparatus can be moved relative to the driverless transport vehicle into a setpoint position. Advantages and advantageous refinements of the first aspect and second aspect of the invention are to be considered to be advantages and advantageous refinements of the third aspect of the invention and vice versa.

Further details of the invention result from the following description of one preferred exemplary embodiment with the associated drawings.

DETAILED DESCRIPTION

In the figures, identical or functionally identical elements are provided with identical designations.

Figure 1:
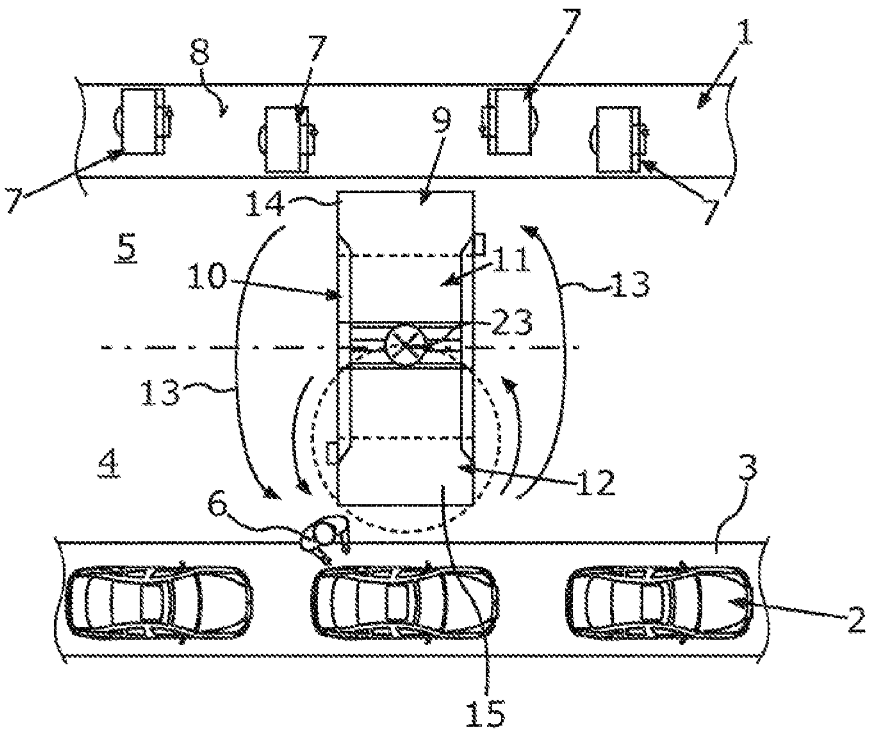
FIG. 1 shows details of a diagrammatic plan view of a conveying system according to the invention for transporting components in the case of production of vehicles.
Figure 2:
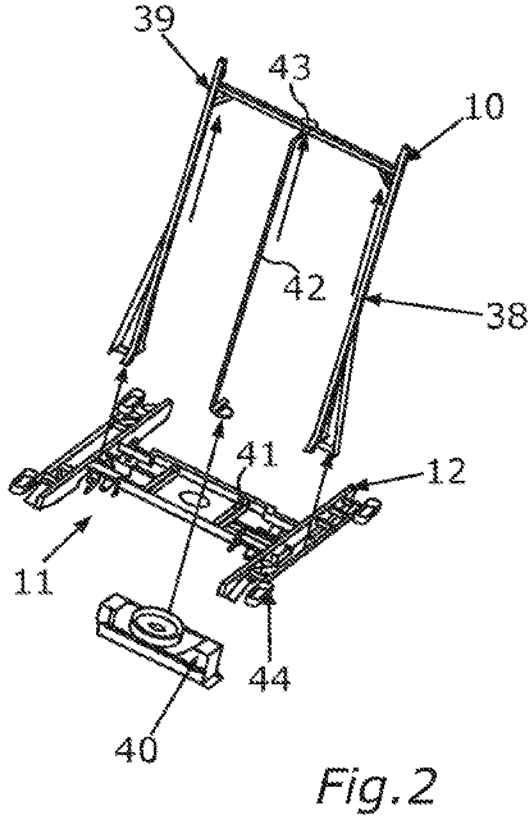
FIG. 2 shows a diagrammatic exploded view of a component of the conveying system, which component is arranged at a disposal station and is configured as a rotary frame.
Figure 10:
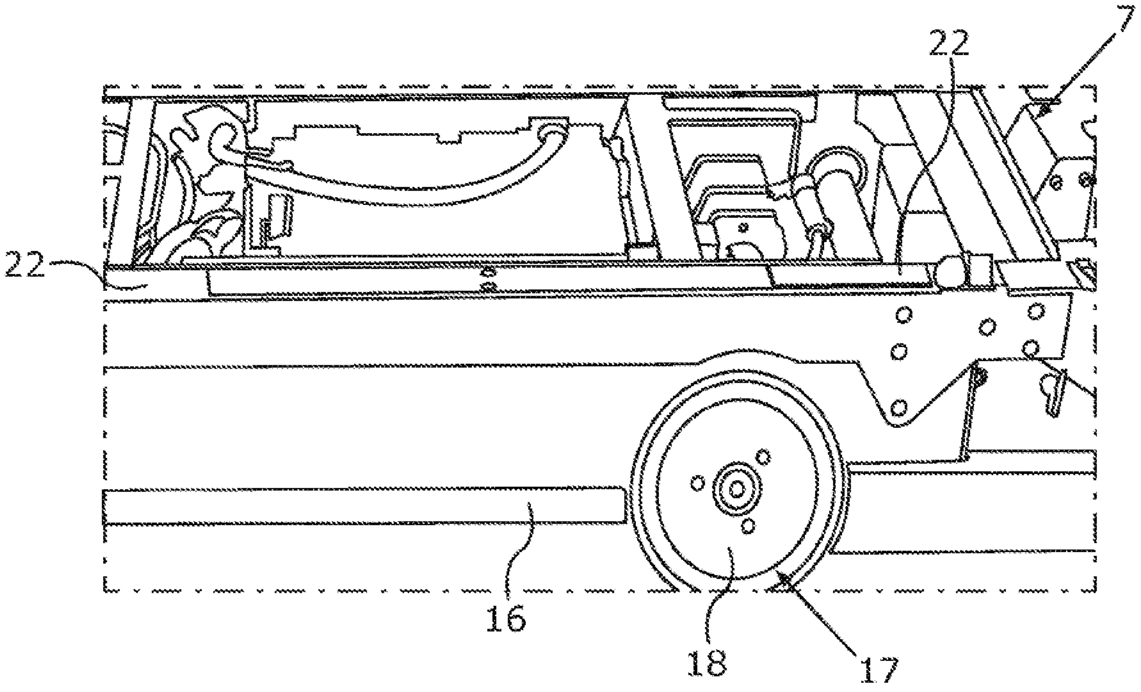
FIG. 10 shows details of a diagrammatic and perspective side view of a driverless transport vehicle of the conveying system.

FIG. 1 shows details of a diagrammatic plan view of a conveying system 1 for transporting components in the case of production of products in the form of vehicles 2. This means that the vehicles 2 are produced by means of the components or from the components. The vehicles 2 are passenger cars which are produced along an assembly line 3 which is also simply called a belt. In FIG. 1, what is known as a belt side is denoted by 4, and what is known as a supply side which is also called a placement side is denoted by 5. Here, at least one person 6 who mounts the components in order, as a result, to produce the vehicles 2 is situated on the belt side 4. The person 6 is also called an assembly employee. The conveying system 1 comprises driverless transport vehicles 7 which move on the supply side 5 in a driverless and automatic manner along a floor 8 of a building, the vehicles 2 being produced in the building. Details of one of the driverless transport vehicles 7 can be seen in FIG. 10.

As will be explained in greater detail in the following text, the components are transported and therefore conveyed on the supply side 5 by means of the driverless transport vehicles 7, in particular in such a way that the respective component is transported on the supply side 5 to a disposal station 9 which is also called a transfer station or a transfer point. A component which is configured as a rotary frame 10 is arranged at the disposal station 9, the rotary frame 10 also being called a rotary table. The rotary frame 10 can be rotated relative to the floor 8 about a rotational axis 23 which runs in the vertical direction, and is supported on the floor 8 in the vertical direction downward at least indirectly, in particular directly. The rotary frame 10 has receiving regions 11 and 12 which lie opposite one another, the rotary frame 10 being situated, in particular constantly, in a position which is such that one of the receiving regions 11 or 12 is arranged on the supply side 5 and the respective other receiving region 12 or 11 is arranged on the belt side 4. In other words, as shown in FIG. 1 by way of arrows 13, the rotary frame 10 is rotated in such a way that the one receiving region 11 or 12 is arranged, in particular constantly, on the supply side 5 and the respective other receiving region 12 or 11 is arranged, in particular constantly, on the belt side 4. A respective container 14 or 15 which is also called a sequence container can be received or is received in the respective receiving region 11 or 12. The respective container 14 or 15 is a carrier, on which at least one of the components can be supported. In particular, the respective container 14 or 15 has a receiving region or receiving space, in which the components or at least a plurality of the components can be received or are received in each case at least partially. This means the following, in particular: by means of the driverless transport vehicle 7, the container 14, for example, is transported along the floor 8 on the supply side 5 and is transferred at the disposal station 9 from the driverless transport vehicle 7 to the rotary frame 10. When the person 6 has removed and installed all the components from the container 15, the rotary frame 10 is rotated about the rotational axis 23, in particular by 180°, with the result that the container 14 which is loaded with components is then arranged on the belt side 4 and the empty container 15 is arranged on the supply side 5. The person 6 on the belt side 4 can thereupon remove the components from the container 14, and the container 15 which is then empty can be transported away from the rotary frame 10 on the supply side 5 by means of the driverless transport vehicle 7. A new, further container which is loaded with components can thereupon be arranged in the receiving region 11. When the person 6 has removed and installed all the components from the container 14, the rotary frame 10 is again rotated by 180°. The abovementioned, further container which is loaded with components is then situated on the belt side 4, and the person 6 can remove and install the components from the further container. The container 15 which is then empty is situated on the supply side 5, and can be transported away from the rotary frame 10 and therefore from the disposal station 9 by means of the driverless transport vehicle 7. In this way, a particularly rapid, inexpensive and space-saving supply of the belt side 4 with the components can be realized, by means of which components the vehicles 2 are produced.

Figure 7:
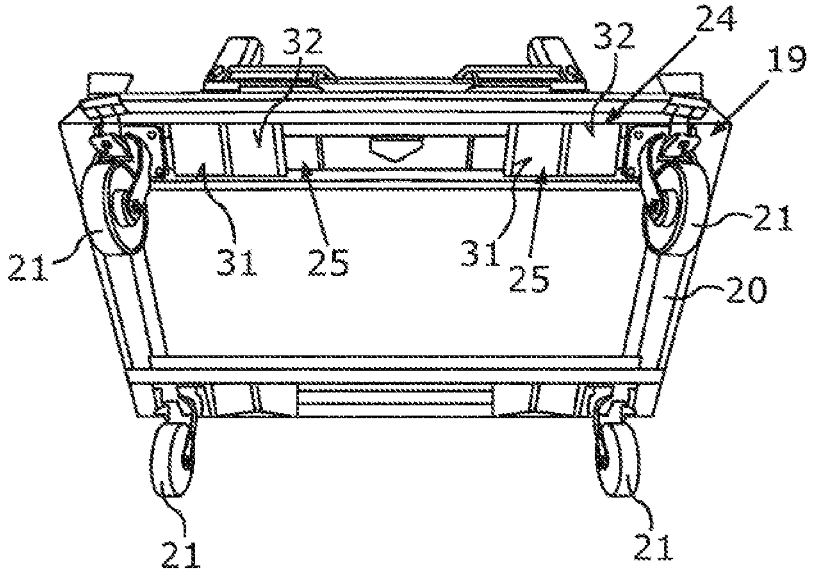
FIG. 7 shows a diagrammatic and perspective bottom view of an apparatus of the conveying system, which apparatus is configured as a roller trolley.

It can be seen particularly clearly from FIG. 7 that the respective, driverless transport vehicle 7 has a chassis 16 and a running gear 17 which is held on the chassis 16 and has a plurality of floor contact elements in the form of wheels. Of the wheels, a wheel which is denoted by 18 can be seen in FIG. 10. The driverless transport vehicle 7 is supported in the vertical direction downward directly on the floor 8 via the floor contact elements. The driverless transport vehicle 7 is driven and, as a result, moved in an automatic and driverless manner along the floor 8 by means of the running gear 17. In other words, the driverless transport vehicle 7 is driven and, as a result, moved in an automatic and driverless manner along the floor 8, while the driverless transport vehicle 7 is supported in the vertical direction downward on the floor 8 via its floor contact elements; the floor contact elements thus roll on the floor 8, and the floor contact elements rotate relative to the chassis 16. Here, for example, the driverless transport vehicle 7 has at least one motor which is held at least indirectly, in particular directly, on the chassis 16, is configured, for example, as an electric motor, and by means of which at least or precisely one of the floor contact elements, in particular at least or precisely two of the floor contact elements, can be driven and, as a result, can be rotated relative to the chassis 16. Here, the driverless transport vehicle 7 can have at least one energy store which is held at least indirectly on the chassis 16 for storing electric energy or electric current, it being possible for the drive motor to be supplied with the electric energy which is stored in the energy store.

Moreover, the conveying system 1 has a roller trolley 19 which is shown in FIG. 7 in a diagrammatic and perspective bottom view and is an apparatus which is configured separately from the driverless transport vehicle 7 and separately from the respective container 14 or 15. The roller trolley 19 has a rack in the form of a frame 20 and rollers 21. The rollers 21 are, for example, mounted eccentrically rotatably on the frame 20, and the rollers 21 can rotate relative to the frame 20. Via its rollers 21, the roller trolley 19 can be supported or is supported in the vertical direction downward directly on the floor 8. The respective container 14 or 15 can be supported, in particular in the vertical direction downward, at least indirectly, in particular directly, on the roller trolley 19, in particular on the frame 20, with the result that the respective container 14 or 15 can then be supported or is supported in the vertical direction downward, in particular such that it can roll, on the floor 8 via the roller trolley 19. In this way, when the respective container 14 or 15 is supported on the roller trolley 19 and in the process is arranged, in particular, on the roller trolley 19, the roller trolley 19 and, with it, the container 14 or 15 which is arranged on it can be rolled along the floor 8 and, as a result, can be moved along the floor 8, for example by a person.

Figure 13:
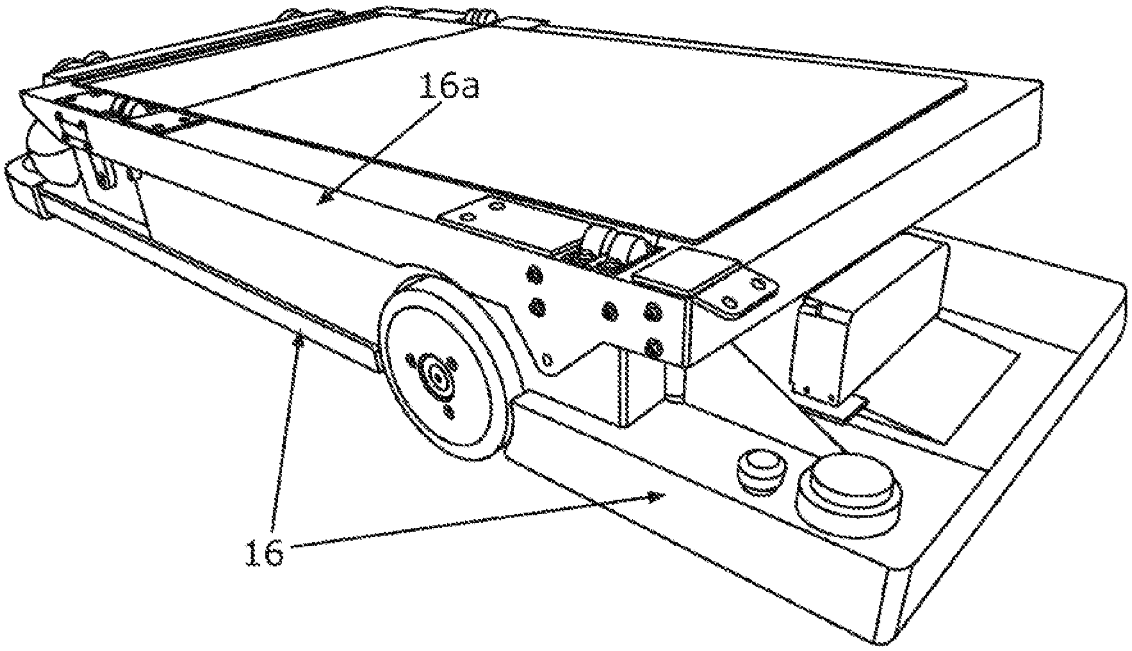
FIG. 13 shows details of a diagrammatic perspective view of the transport vehicle.

The roller trolley 19 and via it, the container 14 or 15 which is supported on the roller trolley 19 can be moved and, as a result, transported along the floor 8 in a driverless and automatic manner by means of the driverless transport vehicle 7, in particular in such a way that the driverless transport vehicle 7 first of all drives at least partially, in particular at least predominantly or completely, below the roller trolley 19 while the latter, for example, is still supported via its rollers 21 in the vertical direction downward on the floor 8 and, as a consequence, while the rollers 21 make direct contact with the floor 8. When the driverless transport vehicle 7 is situated below the roller trolley 19, the chassis 16 is, for example, moved upward in the vertical direction, in particular by means of a lifting device of the driverless transport vehicle 7, and as a consequence is raised and is therefore moved away from the floor 8. It can be seen from FIG. 13 that the chassis 16 can have a lifting frame 16*a*, or a lifting frame 16*a* can be held movably on the chassis 16, in particular in such a way that the lifting frame 16*a* can be moved in the vertical direction, in particular relative to the chassis 16. It is therefore provided, for example, that the lifting frame 16*a* is raised. As a consequence, the chassis 16 or the lifting frame 16*a* can be moved into supporting contact with the roller trolley 19, in particular with the frame 20, at least indirectly, in particular via supporting elements 22 which are configured, for example, from rubber. By way of further raising, which takes place in the vertical direction upward, of the chassis 16 or the lifting frame 16*a* which is, for example, an upper part of the chassis 16, the roller trolley 19 and, via it, the container 14 or 15 which is arranged on the roller trolley 19 are moved upward in the vertical direction and, as a consequence, are raised, in particular in such a way that the rollers 21 lift up from the floor 8 and, as a consequence, the rollers 21 no longer make contact with the floor 8. If the driverless transport vehicle 7 is then moved in the direction of the floor 8 in a driverless and automatic manner, the roller trolley 19 which is arranged on the driverless transport vehicle 7 and the container 14 or 15 which is in turn arranged on it are also as a result moved together with this driverless transport vehicle 7, as a result of which the roller trolley 19 and therefore the container 14 or 15 and the components which are arranged therein are moved and therefore transported along the floor 8.

At the disposal station 9, the driverless transport vehicle 7 drives relative to the rotary frame 10 in a driverless and automatic manner, for example, in such a way that the roller trolley 19 and/or the respective container 14 or 15 are/is moved into the respective receiving region 11 or 12. Thereupon, for example, the chassis 16 or the lifting frame 16*a* is moved in the vertical direction downward again and is therefore moved in the direction of the floor 8. As a result, for example, the roller trolley 19 is let down in such a way that the roller trolley 19 is coupled to the rotary frame 10, in particular in a positively locking manner. Thereupon, the driverless transport vehicle 7 can be moved forward below the roller trolley 19 and below the container 14 or 15 and can be moved away from the disposal station 9 and, as a consequence, from the rotary frame 10, from the container 14 or 15 and from the roller trolley 19. Thereupon, the driverless transport vehicle 7 can be utilized, for example, to correspondingly transport a further roller trolley 19. After the driverless transport vehicle 7 has been moved away from the disposal station 9, the rotary frame 10 and, with it, the container 14 or 15 which is arranged in the receiving region 11 or 12 can be rotated about the rotational axis 23, in order to move the container 14 or 15 which is loaded with workpieces from the supply side 5 to the belt side 4 as a result.

In order to produce the vehicles 2 inexpensively, it is desirable for external dimensions of the rotary frame 10 to be kept as small as possible and to configure them to be larger to as little an extent as possible than respective external dimensions of the respective container 14 or 15 or the roller trolley 19. To this end, however, an orientation, which can be carried out automatically and is precise, of the roller trolley 19 and therefore of the container 14 or 15 relative to the driverless transport vehicle 7 is required, with the result that the driverless transport vehicle 7 can move, in particular drive, the roller trolley 19 or the container 14 or 15 into the respective receiving region 11 or 12, respectively, without undesired collisions occurring between the roller trolleys 19 and the rotary frame 10 and/or between the container 14 or 15 and the rotary frame 10.

Figure 8:
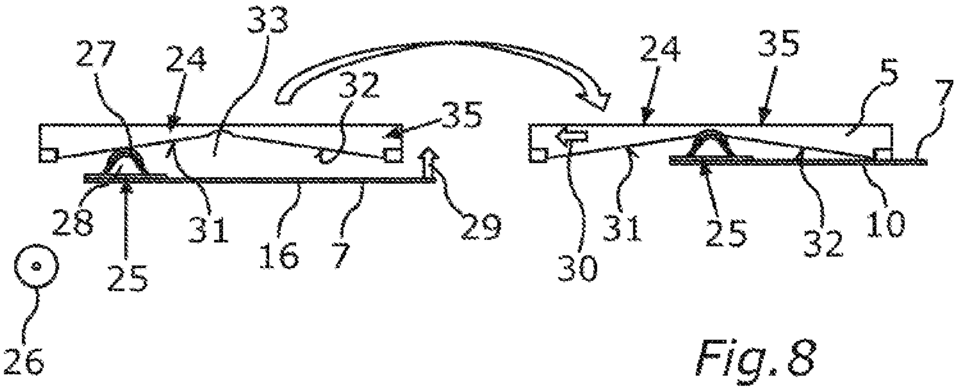
FIG. 8 shows details in each case of diagrammatic side views of a positioning device.
Figure 12:
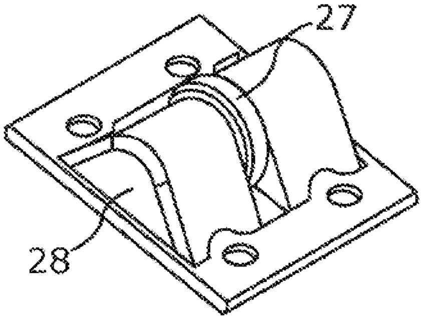
FIG. 12 shows a diagrammatic perspective view of a vehicle-side positioning element of the conveying system.

In order for it then to be possible for the roller trolley 19 and therefore the container 14 or 15 which is arranged on it to be aligned in a particularly simple, precise and preferably automatic way relative to the driverless transport vehicle 7 and, as a consequence, for the components to be transported particularly advantageously, the roller trolley 19 has an apparatus-side, first positioning device 24, as can be seen particularly clearly from FIGS. 7 and 8. As can be seen particularly clearly from FIGS. 8, 10 and 12, moreover, the driverless transport vehicle 7 has a vehicle-side, second positioning device 25. By means of the positioning devices 24 and 25, the roller trolley 19 and, via it, the container 14 or 15 which is arranged on the roller trolley 19 or is supported on the roller trolley 19 can be moved into a setpoint position and can be aligned as a result relative to the driverless transport vehicle 7 with direct and preferably mechanical interaction of the positioning devices 24 and 25. This can be seen particularly clearly using FIG. 8. For example, while the roller trolley 19 is supported on the floor 8 in the vertical direction downward via its rollers 21 and, as a consequence, is standing on the floor 8, the driverless transport vehicle 7 drives relative to the roller trolley 19 in such a way that the driverless transport vehicle 7 drives below the roller trolley 19, in particular below the frame 20, in a driving direction which is illustrated by an arrow 26 in FIG. 8. If the roller trolley 19 is not yet situated in the setpoint position here, the positioning device 25 comes into direct and preferably mechanical interaction with the positioning device 25 in such a way that the positioning device 24 makes direct contact with the positioning device 25. Here, the positioning device 25 has a roller 27 which is mounted on the chassis 16, in particular on the lifting frame 16*a* and, via the latter, on the chassis 16, such that it can be rotated about a rotational axis relative to the chassis 16, in particular via a bearing block 28. Here, the rotational axis of the roller 27 runs parallel to the driving direction which is illustrated by the arrow 26, in the present case runs perpendicularly with respect to the plane of the drawing of FIG. 8 and runs here out of the plane of the drawing 8 toward a respective observer of FIG. 8. If the chassis 16 or the lifting frame 16*a* and, with it, the bearing block 28 and the roller 27 are then raised (as is illustrated by an arrow 29 in FIG. 8) and as a consequence are moved upward in the vertical direction and therefore moved away from the floor 8, in particular in such a way that the rollers 21 lift up from the floor 8, the roller 27 can roll on the positioning device 25 or vice versa. In the example which is illustrated in FIG. 8, the positioning device 25 and therefore the roller trolley 19 and, via it, the container 14 or 15 move in a direction which is illustrated by an arrow 30 in FIG. 8 and runs perpendicularly with respect to the rotational axis of the roller 27, until the roller trolley 19 and therefore the container 14 or 15 reach the setpoint position which is denoted by S in FIG. 8.

To this end, the positioning device 25 has two planar surfaces 31 and 32 which run obliquely with respect to one another. The surfaces 31 and 32 also run obliquely with respect to the vertical direction, with the result that, when the rollers 21 lift up from the floor and the roller trolley 19 is not yet situated in the setpoint position, the roller 27 rolls on the respective surface 31 or 32. As a result, the roller trolley 19 moves in the horizontal direction to the left or the right relative to the driverless transport vehicle 7, depending on which of the surfaces 31 and 32 the roller 27 rolls, in particular until the roller trolley 19 and therefore the container 14 or 15 which is arranged on it reach the setpoint position S.

To this end, an indentation 33 which is set back in the vertical direction upward with respect to the surfaces 31 and 32 and in which the roller 27 can be received at least partially is arranged between the surfaces 31 and 32. When the roller trolley 19 reaches the setpoint position, the roller 27 comes to lie, for example, at least partially in the indentation 33, with the result that the roller trolley 19 comes to lie or stop in the setpoint position. In this way, the setpoint position can be maintained while the roller trolley 19 and, via it, the container 14 or 15 are moved along the floor 8 by means of the driverless transport vehicle 7.

The bearing block 28 which is configured as a holder or shaft holder of the roller 27 which is configured, for example, as a shaft is produced and/or machined, for example, from a steel, in particular from C45. The roller 27 is formed, for example, from a steel, in particular from a quenched and tempered steel and very particularly from 51CrV4 quenched and tempered steel. In particular, the roller 27 can be heat-treated and/or a surface of the roller 27 can be plasma nitrided. Furthermore, it is conceivable that the bearing block 28 is formed from a plastic, in particular from hard plastic, and/or is produced by 3D printing, it being conceivable that the roller 27 is mounted on the bearing block 28 rotatably via a bearing shaft, it being possible for the bearing shaft to be formed and/or machined from a steel, in particular from C45.

Figure 9:
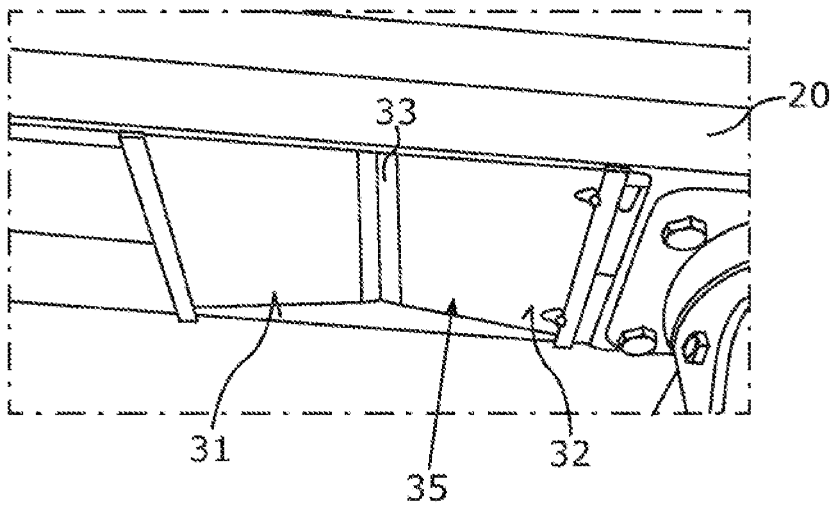
FIG. 9 shows details of a further diagrammatic and perspective bottom view of the roller trolley.
Figure 11:
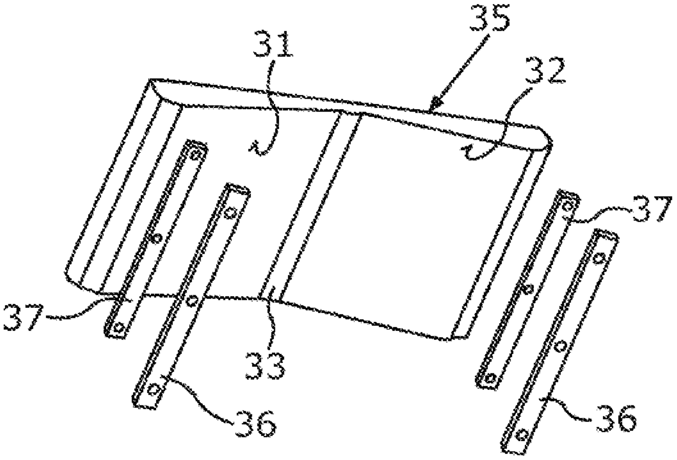
FIG. 11 shows a diagrammatic and perspective bottom view of an apparatus-side positioning element of the conveying system.

As can be seen particularly clearly from FIGS. 8, 9 and 11, the surfaces 31 and 32 and the indentation 33 which is arranged in between are formed by a single-piece positioning element 35 of the positioning device 24. The positioning element 35 is also formed as a plate or centering plate, and is preferably formed and/or machined from a steel, in particular from C45. It can be seen particularly clearly here from FIG. 9 that the positioning element 35 is held on the frame 20 by means of a holding element 36 which is configured separately from the positioning element 35. The frame 20 is therefore a main body of the roller trolley 19, on the main body of which the positioning element 35 is held or fastened in the present case by means of at least or precisely two holding elements 36 which are also called fastening elements. In particular, the positioning element 35 is clamped on the frame 20 (main body) by means of the holding elements 36. Here, the positioning elements 35 are assigned spacer elements 37, by means of which a spacing which runs, in particular, in the vertical direction can be set or is set between the positioning element 35 and the frame 20. In other words, the positioning element is held by way of the spacer elements 37 at a spacing from the frame 20, which spacing runs in the vertical direction, in particular. As a result of the use of different spacer elements which differ from one another, for example, in terms of their thicknesses which run in the vertical direction, different spacings which run in the vertical direction can be set between the positioning element 35 and the frame 20. In the case of the exemplary embodiment which is shown in FIG. 11, the respective spacer element 37 is arranged between the positioning element and the holding element 36, with the result that the respective holding element 36 is supported on the positioning element 35 via the respective spacer element 37.

Furthermore, it is preferably provided that the roller 27 is mounted rotatably via an anti-friction bearing system on the chassis 16 or on the lifting frame 16*a* and, via it, on the chassis 16. To this end, for example, the anti-friction bearing system comprises at least or precisely one anti-friction bearing, in particular a needle bearing, by way of which particularly low-friction mounting of the roller 27 on the chassis 16 or on the lifting frame 16*a* can be produced.

Figure 3:
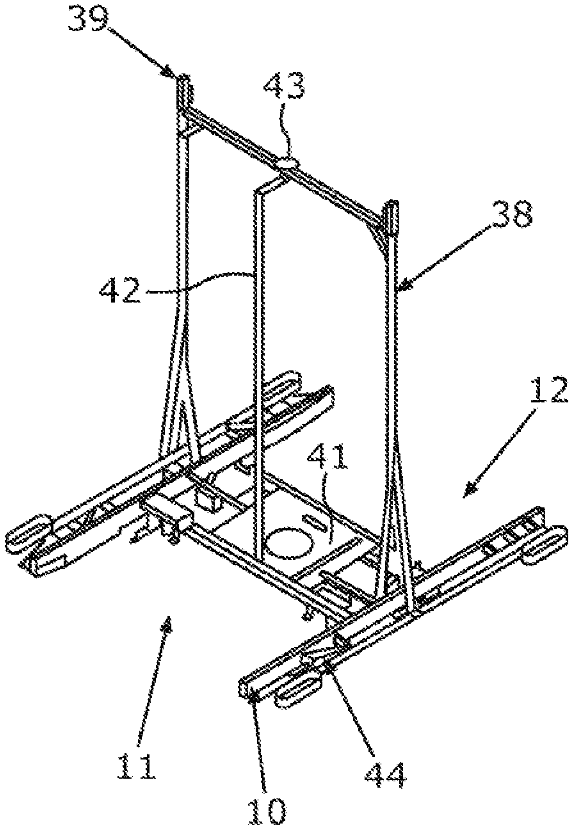
FIG. 3 shows a diagrammatic perspective view of the rotary frame.
Figure 4:
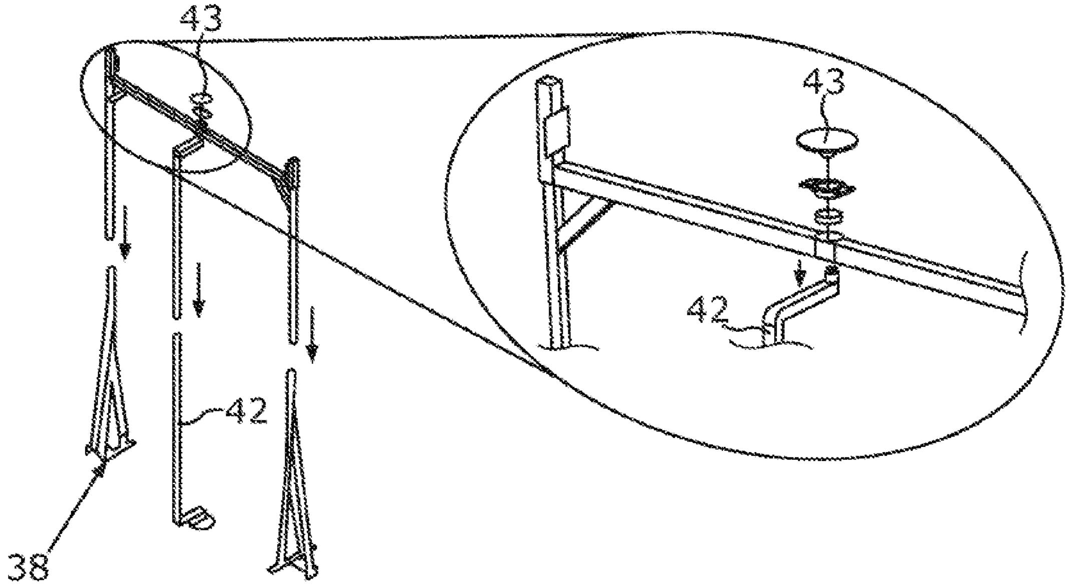
FIG. 4 shows details of diagrammatic exploded views of the rotary frame.
Figure 5:
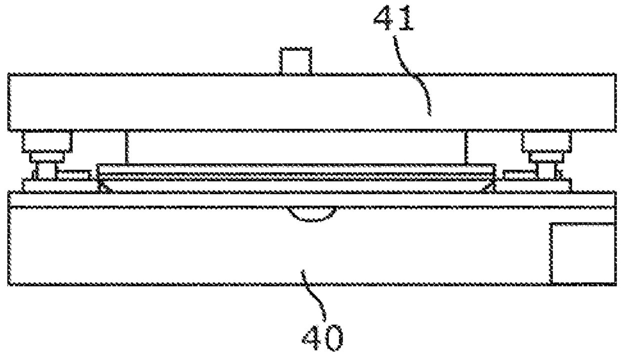
FIG. 5 shows details of a diagrammatic front view of the rotary frame.

It can be seen particularly clearly from FIGS. 3 and 4 that the rotary frame 10 has a base frame 44 and a support frame 38 which is connected to the base frame 44. The base frame 44 and the support frame 38 form an upper part 39 of the rotary frame 10, the upper part 39 of which is mounted rotatably on a sub-construction 40 (which can be seen from FIG. 5) of the rotary frame 10. Via the sub-construction 40, the rotary frame 10 can be supported or is supported in the vertical direction downward directly on the floor 8. The base frame 44 forms a rotor 41 which can be rotated about the rotational axis 23 relative to the sub-construction 40. This means that the upper part 39 and, as a consequence, the base frame 44 and the support frame 38, can be rotated about the rotational axis 23 relative to the sub-construction 40 and therefore relative to the floor 8. Here, a strut 42, configured separately from the support frame 38, of the rotary frame 10 is provided. The strut 42 is connected, for example, to the sub-construction 40 in such a way that the base frame 44 and the support frame 38 can be rotated about the rotational axis 23 relative to the sub-construction 40 and also relative to the strut 42. The strut 42 penetrates a corresponding through opening of the support frame 38 and supports a platform 43, on which preferably at least one (in particular, optical) detection element can be held. By means of the detection element, for example, respective markings of the containers 14 and 15 can be detected, in particular optically. The respective marking is, for example, a barcode or a QR code. When the upper part 39 and, with it, the containers 14 and 15 and therefore the markings are rotated relative to the sub-construction 40 and therefore relative to the strut 42, relative to the platform 43 and therefore relative to the detection element, the detection element no longer detects the marking of the container 14, for example, but rather the marking of the container 15 or vice versa. As a result, the rotation of the rotary frame 10 and, as a consequence, the rotation of the upper part 39 and therefore the rotation of the containers 14 and 15 can be detected or recognized. If a rotation of this type of the rotary frame 10 is determined, the rotation of which as a rule takes place when and only when the container which is arranged on the belt side 4 is empty and is moved to the supply side 5 by way of the rotation, the detection of the rotation of the rotary frame 10 can be utilized as the triggering event to initiate a transport operation. Within the context of the transport operation, the empty container which is situated on the supply side 5 is collected by means of one of the driverless transport vehicles 7 and, as a consequence, is transported away from the rotary frame 10, and a new container which is loaded with components is moved by means of the one driverless transport vehicle 7 or by means of another one of the driverless transport vehicles 7 into the receiving region 11 or 12 which is then situated on the supply side 5, that is to say depending on which of the receiving regions 11 and 12 is currently arranged on the supply side 5.

Figure 6:
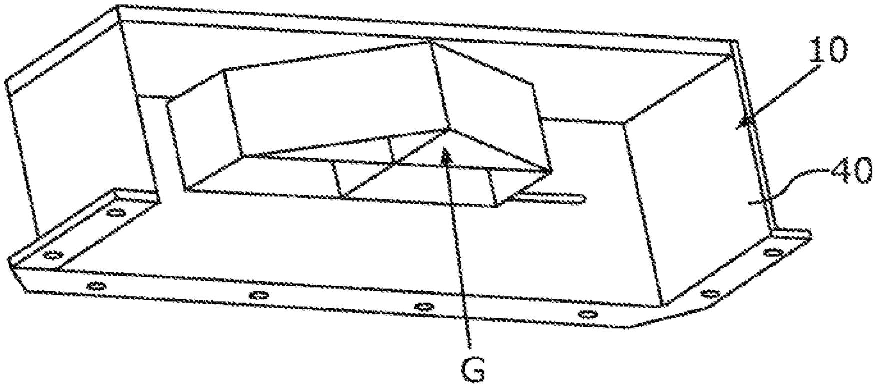
FIG. 6 shows details of a diagrammatic perspective view of the rotary frame.

FIG. 6 shows a part region of the rotary frame 10, in particular of the sub-construction 40. The rotary frame 10, in particular the sub-construction 40, has a defined, three-dimensional geometry G which can be detected or is detected, in particular optically, by means of an in particular optical detection device of the driverless transport vehicle 7. On the basis of the geometry G or as a result of the detection of the geometry G, the driverless transport vehicle 7 can be aligned precisely relative to the rotary frame 10 and, in particular, can drive in the driving direction relative to the rotary frame 10 in such a way that the roller trolley 19 and therefore the respective container 14 or 15 which is situated in the setpoint position is driven into the receiving region 11 or 12, without undesired collisions occurring between the rotary frame 10 and the roller trolley 19 and/or between the rotary frame 10 and the container 14 or 15.

LIST OF DESIGNATIONS

1 Conveying system
2 Vehicles
3 Assembly line
4 Belt side
5 Supply side
6 Person
7 Driverless transport vehicle
8 Floor
9 Disposal station
10 Rotary frame
11 Receiving region
12 Receiving region
13 Arrow
14 Container
15 Container
16 Chassis
**16*a*** Lifting frame
17 Running gear
18 Wheel
19 Roller trolley
20 Frame
21 Roller
22 Supporting element
23 Rotational axis
24 Positioning device
25 Positioning device
26 Arrow
27 Roller
28 Bearing block
29 Arrow
30 Arrow
31 Surface
32 Surface
33 Indentation
35 Positioning element
36 Holding element
37 Spacer element
38 Support frame
39 Upper part
40 Sub-construction
41 Rotor
42 Strut
43 Platform
44 Base frame
G Geometry

The invention claimed is:

1. A conveying system for transporting components, comprising:

at least one driverless transport vehicle which comprises a chassis and a running gear held on the chassis, wherein the running gear is configured to move the driverless transport vehicle along a floor; and at least one apparatus configured to transport the components, wherein the at least one apparatus is configured separately from the driverless transport vehicle and is configured to be transported along the floor by the driverless transport vehicle, wherein the at least one apparatus comprises an apparatus-side positioning device, and wherein the at least one driverless transport vehicle comprises a vehicle-side positioning device configured to directly interact with the apparatus-side positioning device of the at least one apparatus to move the apparatus relative to the driverless transport vehicle into a setpoint position, wherein the vehicle-side positioning device comprises at least one roller or ball that is configured to rotate about at least one rotational axis relative to the chassis, and wherein the apparatus-side positioning device comprises at least one conical surface or at least two planar surfaces which run obliquely or perpendicularly with respect to one another and along which the at least one roller or ball rolls in order to move the apparatus into the setpoint position.

2. The conveying system according to claim 1, wherein the vehicle-side positioning device comprises at least one roller or ball that is configured to rotate about at least one rotational axis relative to the chassis.

3. The conveying system according to claim 2, wherein the at least one roller or ball is formed from a quenched and tempered steel.

4. The conveying system according to claim 2, wherein the at least one roller or ball is mounted rotatably on the chassis via an anti-friction bearing system.

5. The conveying system according to claim 4, wherein the anti-friction bearing system comprises a needle bearing.

6. The conveying system according to claim 1,
wherein the apparatus-side positioning device comprises at least one conical surface or at least two planar surfaces which run obliquely or perpendicularly with respect to one another and along which the vehicle-side positioning device moves in order to move the apparatus into the setpoint position.

7. The conveying system according to claim 6,
wherein the apparatus-side positioning device comprises an indentation set back with respect to the at least two planar surfaces and arranged between the at least two planar surfaces, wherein the indentation is configured to at least partially receive the vehicle-side positioning device.

8. The conveying system according to claim 6, wherein the at least two planar surfaces are formed by a single-piece positioning element.

9. The conveying system according to claim 8,
wherein the positioning element is configured separately from a main body of the apparatus, and wherein the positioning element is held on the main body of the apparatus at a spacing from the main body by a spacer element, which spacer element is configured separately from the main body and separately from the positioning element.

10. The conveying system according to claim 1, wherein the chassis comprises a lifting frame that is movable in a vertical direction relative to the chassis, and wherein the at least one roller or ball is mounted on the lifting frame.

11. The conveying system according to claim 1, wherein the at least one apparatus is a roller trolley having a frame and a plurality of rollers mounted on the frame, via which rollers the roller trolley is supportable on the floor.

12. A method for transporting components by a conveying system, the method comprising:
transporting at least one of the components along a floor via at least one apparatus and at least one driverless transport vehicle, wherein the at least one apparatus is configured separately from the driverless transport vehicle;
moving the at least one driverless transport vehicle along the floor in a driverless and automatic manner by a running gear held on a chassis of the at least one driverless transport vehicle;
causing a vehicle-side positioning device of the at least one driverless transport vehicle to directly interact with an apparatus-side positioning device of the at least one apparatus; and
moving the apparatus relative to the at least one driverless transport vehicle into a setpoint position as a result of the direct interaction between the vehicle-side positioning device and the apparatus-side positioning device, wherein the vehicle-side positioning device comprises at least one roller or ball that is configured to rotate about at least one rotational axis relative to the chassis, and wherein the at least one roller or ball rolls along at least one conical surface or at least two planar surfaces which run obliquely or perpendicularly with respect to one another of the apparatus-side positioning device in order to move the apparatus into the setpoint position.

13. A driverless transport vehicle for transporting at least one apparatus for transporting components, the driverless transport vehicle comprising:
a chassis;
a running gear held on the chassis, the running gear configured to move the driverless transport vehicle along a floor in order to transport the apparatus;
a vehicle-side positioning device configured to interact with an apparatus-side positioning device of the apparatus and move the apparatus relative to the driverless transport vehicle into a setpoint position, wherein the vehicle-side positioning device comprises at least one roller or ball that is configured to rotate about at least one rotational axis relative to the chassis, and wherein the at least one roller or ball is configured to roll along at least one conical surface or at least two planar surfaces which run obliquely or perpendicularly with respect to one another of the apparatus-side positioning device in order to move the apparatus into the setpoint position.

14. The driverless transport vehicle according to claim 13,
wherein the vehicle-side positioning device comprises at least one roller or ball that is configured to rotate about at least one rotational axis relative to the chassis.

15. The driverless transport vehicle according to claim 14, wherein the at least one roller or ball is formed from a quenched and tempered steel.

16. The driverless transport vehicle according to claim 14, wherein the at least one roller or ball is mounted rotatably on the chassis via an anti-friction bearing system.

17. The driverless transport vehicle according to claim 16, wherein the anti-friction bearing system comprises a needle bearing.

18. The driverless transport vehicle according to claim 13,
wherein the vehicle-side positioning device is configured to move along at least one conical surface or at least two planar surfaces which run obliquely or perpendicularly with respect to one another of the apparatus-side positioning device in order to move the apparatus into the setpoint position.

19. The driverless transport vehicle according to claim 18,
wherein the vehicle-side positioning device is configured to be received at least partially in an indentation of the apparatus-side positioning device which is set back with respect to the at least two planar surfaces and is arranged between the at least two planar surfaces.

20. The driverless transport vehicle according to claim 13, wherein the chassis comprises a lifting frame that is movable in a vertical direction relative to the chassis, and wherein the at least one roller or ball is mounted on the lifting frame, and wherein the lifting frame is configured to be raised to bring the at least one roller or ball into interaction with the apparatus-side positioning device.

* * * * *